US009822425B2

(12) United States Patent
Bednarski et al.

(10) Patent No.: US 9,822,425 B2
(45) Date of Patent: *Nov. 21, 2017

(54) PROCESSES FOR RECOVERING METALS FROM AQUEOUS SOLUTIONS

(71) Applicant: CYTEC TECHNOLOGY CORP., Wilmington, DE (US)

(72) Inventors: Troy Allan Bednarski, Chandler, AZ (US); Violina Antoneta Cocalia, Norwalk, CT (US); Matthew Dean Soderstrom, Gilbert, AZ (US); Eduardo Alberto Kamenetzky, Stamford, CT (US); Andrew Michael Cameron, Phoenix, AZ (US); Douglas Harris, Louisville, CO (US)

(73) Assignee: Cytec Technology Corp. DE (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/607,578

(22) Filed: Jan. 28, 2015

(65) Prior Publication Data
US 2015/0135903 A1 May 21, 2015

Related U.S. Application Data

(62) Division of application No. 13/670,737, filed on Nov. 7, 2012, now Pat. No. 8,968,698, which is a division of application No. 12/830,660, filed on Jul. 6, 2010, now Pat. No. 8,328,900.

(60) Provisional application No. 61/223,491, filed on Jul. 7, 2009.

(51) Int. Cl.
C22B 3/00 (2006.01)
C22B 3/16 (2006.01)
C22B 3/26 (2006.01)
C22B 34/34 (2006.01)
C22B 60/02 (2006.01)

(52) U.S. Cl.
CPC .......... C22B 3/1683 (2013.01); C22B 3/0005 (2013.01); C22B 34/34 (2013.01); C22B 60/0226 (2013.01); Y02P 10/234 (2015.11)

(58) Field of Classification Search
CPC ..... C22B 15/0089; C22B 3/08; C22B 3/0017; C22B 60/0226; C22B 34/34; C22B 3/1683
USPC ...................... 423/8–181, 263, 658.5; 75/710
See application file for complete search history.

(56) References Cited

U.S. PATENT DOCUMENTS

| 3,180,703 | A | 4/1965 | Ableson et al. |
| 3,455,677 | A | 7/1969 | Litz |
| 4,000,244 | A | 12/1976 | Mollerstedt et al. |
| 4,026,988 | A | 5/1977 | Wells et al. |
| 4,258,013 | A | 3/1981 | Pyrih et al. |
| 4,275,039 | A | 6/1981 | Ozensoy et al. |
| 4,444,733 | A | 4/1984 | Laferty et al. |
| 4,978,788 | A * | 12/1990 | Dalton ................... C01G 3/003 210/688 |
| 5,188,736 | A | 2/1993 | Pen et al. |
| 5,229,086 | A | 7/1993 | Lam et al. |
| 5,338,520 | A | 8/1994 | Leveque et al. |
| 5,419,880 | A | 5/1995 | Swider et al. |
| 5,670,035 | A | 9/1997 | Virnig et al. |
| 5,928,616 | A | 7/1999 | Bailey |
| 6,149,883 | A | 11/2000 | Ketcham et al. |
| RE36,990 | E | 12/2000 | Cupertino et al. |
| 6,231,784 | B1 * | 5/2001 | Virnig ................... C07C 251/48 252/184 |
| 6,726,887 | B1 * | 4/2004 | Sugarman .............. C01G 3/003 252/184 |
| 6,733,688 | B1 * | 5/2004 | Sugarman ............. C22B 3/0017 252/184 |
| 2004/0126291 | A1 * | 7/2004 | Sudderth ............... C22B 3/0017 423/24 |
| 2007/0189943 | A1 | 8/2007 | Todd et al. |

FOREIGN PATENT DOCUMENTS

| GB | 1551059 A | 8/1979 |
| GB | 1556541 A | 11/1979 |
| GB | 2122593 A | 1/1984 |
| JP | 6192761 A | 7/1994 |
| WO | 9701649 A1 | 1/1997 |
| WO | 2007143832 A1 | 12/2007 |

OTHER PUBLICATIONS

Cao, Y. et al., Mo Kexue Yu Jushu 1989, Investigation of Extraction Equilibrium of Molybdenum (VI) with Cyanex 272, 9(4), pp. 6-12.

(Continued)

Primary Examiner — Steven Bos
(74) Attorney, Agent, or Firm — Charles E. Bell, Esq.; Elizabeth Galletta, Esq.

(57) ABSTRACT

Provided herein are processes for recovering metal present at low concentration from an acidic aqueous solution, including contacting the acidic aqueous solution with an organic phase solution including one or more 5-($C_8$ to $C_{14}$ alkyl)-2-hydroxyaryloxime, thereby extracting at least part of the metal from the acidic aqueous phase; increasing or maintaining the concentration of metal in the organic phase solution by recycling a portion of the organic phase solution containing the metal and contacting the organic phase with an acidic aqueous solution containing the metal; contacting the organic phase solution containing metal with an aqueous phase strip solution comprising an inorganic compound that back-extracts the metal, thereby stripping at least part of the metal from the organic phase solution to the aqueous phase strip solution; and separating the metal from the aqueous phase strip solution, thereby recovering the metal.

20 Claims, 1 Drawing Sheet

(56) References Cited

OTHER PUBLICATIONS

A. Saly et al., Technical Note—Thiophosphinic acids as selective extractants for molybdenum recovery from a low grade ore and spent catalysts, Hydrometallurgy; 41; pp. 99-105; 1996.
International Search Report of PCT/US2010/041032; dated Feb. 2, 2011.
Written Opinion of the ISA for PCT/US2010/041032; dated Feb. 2, 2011.
A. Cruz and A. Reghezza, "Hydrocopper 2007, Chapter 07, New Projects and Expansions," pp. 349-355 (translation provided, pp. 1-10).
B. Moyer, C.O. Price and W.J. McDowell, "Alkaline-Insoluble Trialkylammonium Double SaltsInvolving the Dodecamolybdophosphate Anion. I. Model Studies Using Trioctylamine in Dodecanol—Modified Nonane," Hydrometallurgy, 16 (1986) pp. 177-195, Elsevier Science Publishers B.V., Amsterdam—Printed in the Netherlands.
B. Nyman et al., "The Development of the Outokumpu Solvent Extraction Process for Molybdenum," papers presented at Oslo Symposium, organized by the Norwegian Chemical Society with the Society of Chemical Industry, Solvent Extraction and Ion Exchange and Solvent Extraction held Jun. 1982, pp. V-15-V-35.
P. Zhang et al., "Recovery of Metal Values from Spent Hydrodesulfurization Catalysts by Liquid—Liquid Extraction," Energy & Fuels, 9, pp. 231-239, 1995.
M. Oliazadeh et al., "Application of Solvent Extraction for the Separation of Molybdenum from Nano-Crystaline Cobalt Electrodeposition Effluents,"Hydrometallurgy 2003—Fifth International Conference in Honor of Professor Ian Ritchie, vol. 1: Leaching and Solution Purification, pp. 843-852; edited by the Minerals, Metals & Materials Society in 2003.
A. Saily et al., "Liquid—liquid extraction behavior of V(IV) using phosphinic acids as extractants," Fresenius J Anal. Chem. 360, pp. 266-270, 1998.
P. Behera, et al., "Organophosphinic, Phosphinic Acids and Their Binary Mixtures as Extractants for Molybdenum (VI) and Uranium (VI) from Aqueous HC1 Media," Journal of Radioanalytical and Nuclear Chemistry, Articles, vol. 178, No. 1, pp. 179-192, 1994.
Y. Cao et al., "Investigation of Extraction Equilibrium of Molybdenum (VI) with Cyanex 272" Translation provided pp. 1-13.
C. Bourget et al., "Operational Practices for Cyanex(R) 272 Extractant Circuits," Proceedings of ISEC 2008, vol. 1 pp. 447-452.

\* cited by examiner

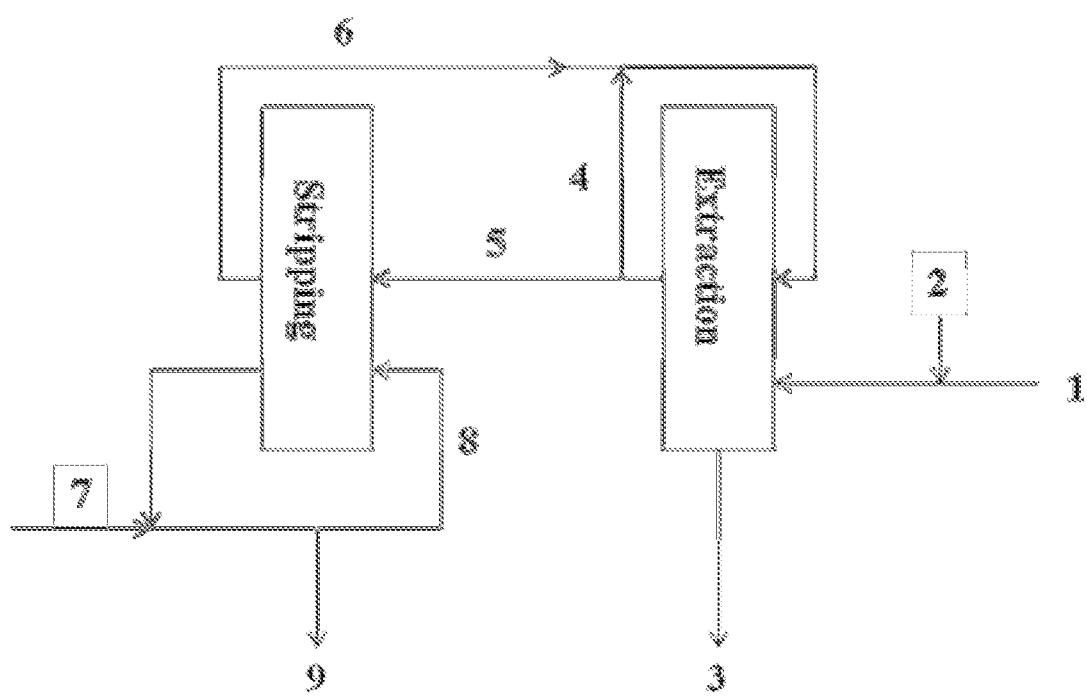

PROCESSES FOR RECOVERING METALS FROM AQUEOUS SOLUTIONS

CROSS-REFERENCE TO RELATED APPLICATIONS

This application is a divisional of co-pending U.S. application Ser. No. 13/670,737 (allowed) filed on Nov. 7, 2012, which claims benefit of priority of U.S. application Ser. No. 12/830,660 (now U.S. Pat. No. 8,328,900), filed Jul. 6, 2010, which claims benefit of priority of U.S. Provisional Application No. 61/223,491, filed Jul. 7, 2009 the content of each of which is incorporated herein by reference in its entirety.

BACKGROUND OF THE INVENTION

1. Field of the Invention

The present invention generally relates to processes for the recovery of metals from aqueous solutions derived from various source materials via solvent extraction methods that use metal-specific extraction reagents. In a more specific aspect, the invention relates to improved processes for the recovery of molybdenum and uranium that can be present in low concentration from acidic aqueous solutions.

2. Description of the Related Art

Traditionally, ion exchange is the preferred method used to recover metals from low concentration feeds. However, given the nature of the mining and metal recovery industry, the feed solutions can have a large degree of variability in the concentration of organics, solids and other contaminants. These contaminants are well known to be very problematic and foul the ion exchange resin leading to a reduction in the mass transfer coefficient and less efficient exchange performance. When metals are extracted from low feed concentrations, the resin will be contacted with the aqueous feed for a longer time before reaching full capacity. This leads to a more rapid fouling of the resin and faster decrease of the resin capacity which requires more frequent regeneration cycles. Sometimes fouling of the resins leads to resin breakdown. The regeneration and/or cleaning of the resin is very laborious when the resin is fouled, producing large amounts of waste and even after extensive washings the exchange capacity of the resin can be significantly altered. Additionally, as the resin is more frequently regenerated and/or washed, the physical properties of the resin can be drastically altered.

In contrast, solvent extraction is a well established technology that can be extremely selective toward a specific target metal and is capable of handling significant amounts of solids, cruds, particulates, and organics. One route to recover metals from ores is by contacting the ore with an aqueous solution containing a leaching agent such as an acid which extracts the metal from the ore into solution. The aqueous leach solution, called pregnant leach solution, is then treated via a solvent extraction process wherein the pregnant leach solution is contacted with a non-aqueous (e.g., organic) solution containing a metal-specific extraction reagent. This reagent extracts the metal from the aqueous phase into the non-aqueous phase; the aqueous leaching solution, called raffinate is generally recycled back to the leaching process to dissolve more metal. The aqueous leach solution may contain other metals than the primary metals. For example it has been reported by A. Cruz and A. Reghezza, Hydrocopper 2007, Chapter 07 New projects and expansions, p. 349-355 that molybdenum is found in the different aqueous streams involved in the extraction of copper from copper ores with sulfuric acid. The molybdenum from these streams is valuable and is worth recovering, even though only present in low concentration (e.g., from 1 ppm to 1,000 ppm). While recovery of molybdenum from oxidized molybdenum sources via solvent extraction has been generally investigated, solvent extraction technology has not typically been used in recovering such metals that are present only in low concentrations due to inefficiency.

For example, sources of oxidized molybdenum include oxidized molybdenite and molybdenum resulting from leaching of any molybdenum containing ores. Other sources of oxidized molybdenite include, spent catalyst, recycled alloys containing molybdenum, scrubbing solutions from the roasters, smelting residues, alloys, leaching of molybdenite concentrate, pressure oxidized molybdenite, etc.

Molybdenum solvent extraction from acidic media using amines has been described in U.S. Pat. No. 3,455,677; U.S. Pat. No. 4,000,244 and U.S. Pat. No. 4,444,733 and is used to extract molybdenum from aqueous solutions. However the drawbacks to these methods include silicon transfer in the organic phase which is associated with precipitation during stripping, co-extraction of phosphorus, arsenic, antimony, lead, bismuth and selenium, third phase formation, poor phase disengagement, and also poor solubility of molybdenum-amine complexes. The presence of phosphorus in the aqueous feed leads to the formation of a third phase which has been characterize by Moyer et al., W. J. McDowel, Hydrometallurgy, 1986, 16, p. 177-195 as $PMo_{12}O_{40}^{3-}$.

Another venue explored to recover molybdenum is using bis(2-ethylhexyl)phosphoric acid (DEHPA) or phosphonic acids as described by B. Nyman et al. in Oslo Symposium 1982, Ion Exchange and Solvent Extraction, Ed. Joan Frost Urstad and Gerd Borgen, Society of Chemical Industry, pp. V-15-V-35, 1982. However, these methods suffer from a high level of iron being co-extracted with molybdenum.

Oximes also have been investigated for molybdenum extraction in U.S. Pat. No. 4,026,988, but their application is limited by the reduced stability of the oximes in the basic media which is necessary to fully strip molybdenum from the organic phase.

The use of phosphinic acids to extract molybdenum has been described in JP6192761A; P. Zhang et al., Energy & Fuels 1995, 9, 231-239; M. Oliazadeh et al., Hydrometallurgy 2003-Fifth International Conference in Honor of professor Ian Ritchie-Volume 1: Leaching and Solution Purification, 843-852, 2003; A. Saily et al., Fresenius J. Anal. Chem, 360, 266-270, 1998; P. Behera et al., Journal of Radioanalytical and Nuclear Chemistry, 178(1), 179-192; and Y. Cao et al., Mo Kexue Yu Jishu, 9(4), 6-12, (1989).

Recovery of molybdenum from acidic aqueous solutions using phosphinic acids such as Cyanex®272 (available from Cytec Industries, Woodland Park N.J.) have been described in Japanese patent application JP 6-192761 and P. Zhang et al., Energy & Fuels 1995, 9, 231-239. Zhang et. al reported using a large excess of $NH_4OH$. However, this process has the drawback of significant amounts of phosphinic acids being transferred to the aqueous phase, which results in important losses of extractant as well as significant ammonium and water transfer into the organic phase. Consequently, when the organic phase is recycled back to the extract stage considerable amounts of ammonium salts build up in the acidic aqueous solution. In addition emulsion formation (i.e., phase disengagement) has been reported. Thus, these solvent extraction processes for recovering molybdenum are not practical for use on an industrial scale.

Accordingly, the solvent extraction processes for recovering metals from aqueous solutions from various sources require further improvement. Processes that fine tune metallurgical organic:aqueous (O:A) ratios so as to selectively recover metals present in only trace amounts from existing operations without downstream impact on leaching operations or solvent extraction operations, thereby effectively eliminating separate mining costs for such metals, would be a useful advance in the art and could find rapid acceptance in the metallurgical mining industry. Additionally, solvent extraction processes that use ammoniacal solutions in the stripping step and that do not give rise to phase disengagement issues or emulsion formation would also be a useful improvement.

SUMMARY OF THE INVENTION

The discovery detailed herein provides improved processes for selectively recovering metals from aqueous solutions from various sources via solvent extraction methods. Such processes provide an efficient and economic manner to recover metals present only in trace amounts in aqueous solutions by fine tuning the metallurgical organic phase to the aqueous phase ("metallurgical O:A ratios" or "O/A ratio") in order to obtain both good mixing properties (i.e., uniform droplet size) and high extraction of such metals from existing leaching operations. Such processes according to the invention as described and provided herein can be performed without downstream impact on the leaching operation or solvent extraction operation of existing solvent extraction processes and can be performed contemporaneously therewith as part of the existing solvent extraction process, thereby eliminating separate mining costs. Additionally, the processes according to the invention as herein described provide improvements in those solvent extraction methods relying on ammonium-based stripping solutions and provide good phase disengagement characteristics without third-phase formation or emulsion generation.

Accordingly, the invention described in detail herein provides, in one aspect, a process for recovering molybdenum from an acidic aqueous solution containing molybdenum by contacting the aqueous solution with an organic phase solution including a phosphinic acid, thereby extracting at least part of the molybdenum from the aqueous phase to the organic phase; contacting the organic phase with an aqueous phase strip solution including an inorganic compound and having a pH from 5 to 11, thereby stripping at least part of the molybdenum from the organic phase to the aqueous phase strip solution, with the proviso that when the inorganic compound is $NH_4OH$, the concentration of free ammonia is from 0.01 mM to 1.0 M; and separating the molybdenum from the aqueous phase strip solution, thereby recovering molybdenum.

In another aspect, the invention provides a solvent extraction process for recovering metals present only in low concentration from aqueous solutions by contacting the aqueous solution with an organic phase solution, thereby extracting at least part of the metal from the aqueous phase; recycling from 50-100% of the organic phase solution containing the metal and contacting the organic phase with an aqueous solution containing the metal, thereby increasing or maintaining the concentration of the metal in the organic phase; contacting the organic phase solution containing metal with an aqueous phase strip solution including a compound that back-extracts the metal, thereby stripping at least part of the metal from the organic phase solution to the aqueous phase strip solution; and separating the metal from the aqueous phase strip solution, thereby recovering the metal.

These and other objects, features and advantages of this invention will become apparent from the following detailed description of the various aspects of the invention taken in conjunction with the accompanying FIGURES and Examples.

BRIEF DESCRIPTION OF THE DRAWINGS

FIG. 1 is a flow sheet illustrating an embodiment of a process for recovering metals from an aqueous solution according to the invention as described herein.

DETAILED DESCRIPTION

As summarized above, the processes that have now been discovered and disclosed herein are useful for recovering metals from aqueous solutions using O:A ratios providing good phase disengagement without formation of a third-phase or emulsion, and useful for recovering metals that are present only in low concentration (i.e., trace amounts) in aqueous solutions.

Definitions

As employed above and throughout the disclosure, the following terms are provided to assist the reader. Unless otherwise defined, all terms of art, notations and other scientific terminology used herein are intended to have the meanings commonly understood by those of skill in the chemical arts. As used herein and in the appended claims, the singular forms include plural referents unless the context clearly dictates otherwise.

Throughout this specification the terms and substituents retain their definitions. A comprehensive list of abbreviations utilized by organic chemists (i.e. persons of ordinary skill in the art) appears in the first issue of each volume of the *Journal of Organic Chemistry*. The list, which is typically presented in a table entitled "Standard List of Abbreviations" is incorporated herein by reference.

The term "molybdenum" as used herein refers to any anionic or cationic molybdenum species with oxidation states higher than 0.

The term "metal" as used herein refers to any element of the periodic table (or species thereof) with oxidation states higher than 0 and associated with the groups chosen from main metals, transition metals, alkali metals, alkaline earth metals, metalloids, rare earth metals, lanthanides, actinides, semi-metals, and semi-conductors.

Alkyl is intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s- and t-butyl and the like. Preferred alkyl groups are those of $C_{30}$ or below. Cycloalkyl is a subset of alkyl and includes cyclic hydrocarbon groups having from 3 to 30 carbon atoms, preferably from 3 to 8 carbon atoms as well as polycyclic hydrocarbons having 7 to 10 carbon atoms. Examples of cycloalkyl groups include c-propyl, c-butyl, c-pentyl, and the like. Examples of $C_7$ to $C_{10}$ polycyclic hydrocarbons include ring systems such as norbornyl and adamantyl.

Alkoxy or alkoxyalkyl refers to groups of from 1 to 30 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like.

Aryl refers to a 5- or 6-membered aromatic carbocycle ring containing; a bicyclic 9- or 10-membered aromatic ring system; or a tricyclic 13- or 14-membered aromatic ring system. The aromatic 6- to 14-membered carbocyclic rings include, e.g., benzene, naphthalene, indane, tetralin, and fluorene.

The term "aralkyl" as used herein is a broad term and is used in its ordinary sense, including, without limitation, to refer to an alkyl having at least one alkyl hydrogen atom replaced with an aryl moiety, such as benzyl, —$CH_2$(1 or 2-naphthyl), —$(CH_2)_2$phenyl, —$(CH_2)_3$phenyl, —CH(phenyl)$_2$, and the like. The term "alkylaryl" as used herein is a broad term and is used in its ordinary sense, including, without limitation, to refer to an aryl having at least one aryl hydrogen atom replaced with an alkyl moiety. Particularly preferred aryl groups include $C_{6-12}$ aryl and $C_{7-20}$ aralkyl groups.

Heterocycle means a cycloalkyl or aryl residue in which from one to three carbons is replaced by a heteroatom selected from the group consisting of N, O and S. The nitrogen and sulfur heteroatoms may optionally be oxidized, and the nitrogen heteroatom may optionally be quaternized. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, tetrahydrofuran and the like. It is to be noted that heteroaryl is a subset of heterocycle in which the heterocycle is aromatic. Examples of heterocyclyl residues additionally include piperazinyl, 2-oxopiperazinyl, 2-oxopiperidinyl, 2-oxo-pyrrolidinyl, 2-oxoazepinyl, azepinyl, 4-piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, tetrahydrofuryl, tetrahydropyranyl, thienyl, benzothienyl, thiamorpholinyl, thiamorpholinylsulfoxide, thiamorpholinylsulfone, oxadiazolyl, triazolyl and tetrahydroquinolinyl.

The term "alkylcyclo" as used herein is a broad term and is used in its ordinary sense, including, without limitation, to refer to a C6-C30 cyclocarbon having at least one hydrogen atom replaced with an alkyl moiety. Particularly preferred cyclocarbon groups include $C_{6-18}$ cyclocarbons.

The term "cycloalkylaryl" as used herein is a broad term and is used in its ordinary sense, including, without limitation, to refer to an aryl having at least one aryl hydrogen atom replaced with a cycloalkyl moiety. Particularly preferred aryl groups include $C_{6-12}$ aryl and $C_{7-20}$ aralkyl groups.

Substituted alkyl, aryl, cycloalkyl, heterocyclyl, etc. refer to alkyl, aryl, cycloalkyl, or heterocyclyl wherein up to three H atoms in each residue are replaced with halogen, haloalkyl, hydroxy, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, halobenzyl, heteroaryl, phenoxy, benzyloxy, heteroaryloxy, benzoyl, halobenzoyl, or loweralkylhydroxy.

The term "halogen" means fluorine, chlorine, bromine or iodine.

As used herein the phrase "metal present in low concentration" or "metal in trace amount" or "minor metal" refers to a metal having a concentration in solution of from 1 ppm to 1,000 ppm. Such metals are often considered to be impurities in ores containing metals in significantly higher concentration. Metals present in ore at significantly higher concentration are typically referred to as "major metals" and include, for example, copper.

The terms "g/l," "g/L," or "gpl" are all understood to mean "grams per liter."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Solvent Extraction Processes

In one aspect, the present invention provides a process for recovering molybdenum from an acidic aqueous solution containing molybdenum by contacting the aqueous solution with an organic phase solution including a phosphinic acid, thereby extracting at least part of the molybdenum from the aqueous phase to the organic phase; contacting the organic phase with an aqueous phase strip solution including an inorganic compound and having a pH from 5 to 11, thereby stripping at least part of the molybdenum from the organic phase to the aqueous phase strip solution, with the proviso that when the inorganic compound is $NH_4OH$, the concentration of free ammonia is from 0.01 mM to 1.0 M; and separating the molybdenum from the aqueous phase strip solution, thereby recovering molybdenum.

The processes according to the invention can be applied to any molybdenum containing stream. It is advantageously applied to a molybdenum containing stream resulting from an existing leaching operation where molybdenum is present in solution. In such embodiments, the molybdenum can be recovered without downstream impact on the leaching operation or other SX operations. Additionally, molybdenum can be economically recovered without further mining costs since it is already present in the solution. In certain embodiments, molybdenum concentration in the leach solutions may be increased by acidifying existing heaps/dumps/tails which contain precipitated molybdenum. Other sources of molybdenum can also be used and an additional leaching step might then be necessary in those cases. In such embodiments, this additional leach solution can be added to the existing leach solution and processed prior to return to the primary leach inventory.

Accordingly, in certain embodiments of the present invention, different acidic aqueous solutions may be used as the aqueous feed solution, such as leach solutions from existing solvent extraction ("SX") operations, i.e. copper SX operations, scrub liquors from acid plants/smelting operations, leach solutions from the processing of flue dusts, filter cakes, molybdenum oxide ores, reprocessing of spent catalysts, or other waste streams containing molybdenum such as, but not limited to, lubricant wastes. In a preferred embodiment, for example, the acidic solution is a raffinate from a copper extraction process, especially utilizing sulfuric acid. More than one source of aqueous solution containing metal can be used.

In one embodiment, the metal containing aqueous feed solution can be acidified prior to going to the extraction step in order to limit loading other impurities (e.g. Iron, Aluminum, Vanadium, etc). While it is common practice in current SX processes to add acid to the leach solution (post SX) to enhance metal dissolution, the current invention provides possibility and benefit of adding the acid to the raffinate stream of an existing SX operation prior to extracting the target metal in order to enhance metal selectivity and recovery, and before the leach solution is returned to the primary metal extraction process. The acidic aqueous solution containing molybdenum preferably has a pH lower than 4, more preferably lower than 2.5, and most preferably lower than 1.

Phosphinic acids used in the organic phase solutions according to processes of the present invention are generally represented by the following structures:

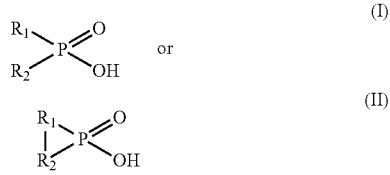

wherein $R_1$ and $R_2$ are individually chosen from $C_1$-$C_{30}$ alkyl, $C_3$-$C_{30}$ cycloalkyl, $C_3$-$C_{30}$ alkoxyalkyl, $C_4$-$C_{30}$ alkylcyclo, $C_7$-$C_{30}$ alkylaryl, $C_7$-$C_{30}$ aralkyl, and $C_8$-$C_{30}$ cycloalkylaryl radicals that are optionally substituted. In certain embodiments, $R_1$ and $R_2$ are independently chosen from a $C_4$-$C_{12}$ alkyl.

Phosphinic acids suitable for use with the present invention include, but are not limited to, those described in WO2007/143832: dimethyl phosphinic acid; diethyl phosphinic acid; di-n-propyl phosphinic acid; diisopropyl phosphinic acid; di-n-butyl phosphinic acid; diisobutyl phosphinic acid; di-n-pentyl phosphinic acid; di-n-hexyl phosphinic acid; di-n-heptyl phosphinic acid; di-n-octyl phosphinic acid; di-n-nonyl phosphinic acid; di-n-decyl phosphinic acid; di-n-dodecyl phosphinic acid; di-n-tetradecyl phosphinic acid; di-n-hexadecyl phosphinic acid; di-n-eicosyl phosphinic acid; di-norbornyl phosphinic acid; bis (2,4,4-trimethylpentyl)-phosphinic acid; (2,4,4-trimethylpentyl)cyclohexyl phosphinic acid; (2,4,4-trimethylpentyl)octyl phosphinic acid; (2,4,4-trimethylpentyl)(1,1,3,3-tetramethylbutyl)phosphinic acid; (1,1,3,3-tetramethylbutyl)(2-ethylhexyl)phosphinic acid; (2,4,4-trimethylpentyl)(2-ethylhexyl)phosphinic acid; (2,4,4-trimethylpentyl)(1-methyl-1-ethylpentyl)phosphinic acid; (1-methyl-1-ethylpentyl)(2-ethylhexyl)phosphinic acid; dicyclopentyl phosphinic acid; dicyclohexyl phosphinic acid; dicyclooctyl phosphinic acid; cyclohexyl, n-butyl phosphinic acid; cyclopentyl, n-dodecyl phosphinic acid; cyclooctyl ether phosphinic acid; 2,4,6-triisopropyl-1,3,5-dioxophosphorinane, 5-hydroxy, 5-oxide phosphinic acid; cyclohexyl, phenyl phosphinic acid; cyclopentyl-p-tolyl phosphinic acid; cyclooctyl-p-chlorophenyl phosphinic acid, diphenyl phosphinic acid; di-o-tolyl phosphinic acid; di-m-tolyl phosphinic acid; di-p-tolyl phosphinic acid; bis (2,3-dimethylphenyl) phosphinic acid; bis(2,4-dimethylphenyl) phosphinic acid; bis(2,5-dimethylphenyl) phosphinic acid; bis(2,6-dimethylphenyl) phosphinic acid; bis(3,4-dimethylphenyl) phosphinic acid; bis(3,5-dimethylphenyl) phosphinic acid; di-(p-ethylphenyl) phosphinic acid; di-(p-octylphenyl) phosphinic acid; ethylphenyl, n-butylphenyl phosphinic acid; n-octylphenyl, n-hexadecylphenyl phosphinic acid; ethyl-o-tolyl phosphinic acid; n-octyl-p-tolyl phosphinic acid; bis(o-chlorophenyl) phosphinic acid; bis (m-chlorophenyl phosphinic acid; bis(p-chlorophenyl) phosphinic acid; methyl-o-chlorophenyl phosphinic acid; n-propyl-p-chlorophenyl phosphinic acid, n-dodecyl-p-chlorophenyl phosphinic acid; dibenzyl phosphinic acid; methyl-naphtyl phosphinic acid; diallyl phosphinic acid; cyclohexyl, 1-hydroxycyclohexyl phosphinic acid; bis(2-methyl-1-hydroxypentyl) phosphinic acid; benzyl, alphahydroxybenzyl phosphinic acid; o-chlorobenzyl, alpha-hydroxy-o-chlorobenzyl phosphinic acid; p-chlorobenzyl, alpha-hydroxy-p-chlorobenzyl phosphinic acid; phenyl, alpha-methylbenzyl phosphinic acid; cyclopentyl, 1-hydroxycyclopentyl phosphinic acid; alpha-methylbenzyl, alpha-hydroxy-alpha-methylbenzyl phosphinic acid; 1-methylpentyl, 1-hydroxy-1-methylpentyl phosphinic acid; n-octyl, alpha hydroxybenzyl phosphinic acid; (1-hydroxy-1methylethyl)isopropyl phosphinic acid. In addition any mixtures of one of more phosphinic acids may be used. Preferred phosphinic acids are bis(2,4,4-trimethylpentyl)-phosphinic acid; (2,4,4-trimethylpentyl)(1,1,3,3-tetramethylbutyl)phosphinic acid; (1,1,3,3-tetramethylbutyl)(2-ethylhexyl)phosphinic acid; (2,4,4-trimethylpentyl)(2-ethylhexyl)phosphinic acid; (2,4,4-trimethylpentyl)(1-methyl-1-ethylpentyl)phosphinic acid; (1-methyl-1-ethylpentyl)(2-ethylhexyl)phosphinic acid; and combinations thereof.

In certain preferred embodiments, the phosphinic acid is chosen from: bis(2,4,4-trimethylpentyl)-phosphinic acid; (2,4,4-trimethylpentyl)(1,1,3,3-tetramethylbutyl)phosphinic acid; (1,1,3,3-tetramethylbutyl)(2-ethylhexyl)phosphinic acid; (2,4,4-trimethylpentyl)(2-ethylhexyl)phosphinic acid; (2,4,4-trimethylpentyl)(1-methyl-1-ethylpentyl)phosphinic acid; (1-methyl-1-ethylpentyl)(2-ethylhexyl)phosphinic acid; and combinations thereof.

In certain embodiments, the organic phase may comprise a large number of inert water-immiscible organic solvents as diluents for the phosphinic acids. Examples of such organic solvents include, but are not limited to, aliphatic and aromatic hydrocarbon solvents such as kerosene. Preferred solvents include, for example, aromatic or aliphatic solvents that have flash points of 120° F. or higher and have very low water solubility. Examples of commercially available solvents include: ORFOM® SX-12, SX-7, SX-11, SX-80, and SX-18 (available from Chevron Phillips Chemical LP, The Woodlands, Tex.); ISOPAR™, NORPAR™, and ESCAID™ 100, 110, and 120 (available from ExxonMobil, Houston, Tex.); or any and other organic solvents from various petroleum and kerosene fractions.

The concentration of phosphinic acid in the organic phase solution according to the processes of the invention is generally from 0.01 to 1.5 mole/l. In certain embodiments, the concentration is preferably from 0.05 to 0.8 mole/l and in other embodiments the concentration of phosphinic acid is more preferably from 0.2 to 0.6 mole/l.

The use of modifiers and/or kinetic boosters in the extraction step is also contemplated by the processes according to the present invention. While the use of modifiers may slightly reduce the extraction of metal into the organic phase solution, they can improve the overall phase disengagement in the subsequent stripping step.

Accordingly, in some embodiments, the organic phase solution further includes a modifier compound that contains a functional group chosen from: phenols; aromatic esters; aliphatic esters; organophosphorus compounds; phosphates; phosphine oxides; aromatic aliphatic alcohols; aliphatic alcohols; nitriles; ketones; amides; carbamates; sulfoxides; ureas; carbonates; oximes; ethers; polyethers; ester-ethers; salts chosen from amines, phosphonium, ammonium, imidazolium, sulfonium, and pyridinium; and combinations thereof. In certain embodiments, the functional group of the modifier is alcohol, which includes, for example, $C_8$-$C_{24}$ alcohols such as, but not limited to, tridecanol. In other embodiments, the functional group of the modifier is an ester and includes, but is not limited to, 2,2,4-trimethyl-1,3-pentanediol diisobutyrate ("TXIB"). In still other embodiments, the functional group of the modifier is a phosphine oxide and includes, but is not limited to, trialkylphosphine oxides such as tris(2,4,4-trimethylpentyl)phopshine oxide or trioctylphosphine oxide. In some embodiments, the modifier can include a combination of these functional groups.

The extraction steps according to the processes of the present invention can be conducted according to any method known by those skilled in solvent extraction processes. Extraction may be carried out in mixer settlers, columns, centrifuges, static mixers, reactors or other suitable contacting/separation equipment. The extraction step may contain one or more extraction stages and may include wash/scrub stages, and/or coalescers to remove impurities and reduce entrainment contamination.

In certain embodiments, the processes for recovering molybdenum from acidic aqueous solutions can further include recycling from 5 to 100% of the organic phase solution containing molybdenum and contacting the organic phase with an acidic aqueous solution containing molybdenum, thereby increasing or maintaining the concentration of molybdenum in the organic phase. In some embodiments, the percentage of the organic phase containing molybdenum that is subjected to the recycling step is from 80 to 99.9%. According to a preferred embodiment, the organic phase is 100% recycled during the start up phase of the process.

In certain embodiments, the recycling step can include flowing an aqueous phase solution in contact with the organic phase solution containing molybdenum wherein the metallurgical organic phase to aqueous phase ratio is 0.001 to 0.20, and setting an internal organic phase to aqueous phase ratio of 0.5 to 2.0 in the mixer, thereby resulting in uniform droplet size distribution and increasing or maintaining the concentration of molybdenum in the organic phase solution. Those of ordinary skill in the art will appreciate that uniform droplet size distribution is a resulting effect of good mixing characteristics of the organic phase solution and the aqueous phase solution, and that the recycling step can be used to effectively concentrate the molybdenum (or any metal that is only present at low concentration) in the organic phase solution, thereby reducing the size of the downstream processing equipment and greatly enhancing the economics of the process according to the invention.

As used herein the term "metallurgical organic phase to aqueous phase ratio" is defined as being the ratio of the flow of fresh solutions of organic phase and aqueous phase to the mixer excluding any direct recycle. The mix box or internal organic phase to aqueous phase ratio (hereinafter referred to as "internal organic phase to aqueous phase ratio") is the ratio of the volume of organic and aqueous phase in the mixer. In cases where no recycle is used, the internal organic phase to aqueous phase ratio is the same as the metallurgical organic phase to aqueous phase ratio. Although SX processes are not typically used for recovery of metals present in only low concentration (e.g., ppm) from solution, the processes according to the present invention have demonstrated that a low metallurgicaloprganic phase to aqueous phase ratio may be utilized in the extraction step, while obtaining reasonable recovery of molybdenum. This allows metals present in only low concentration to be concentrated in the organic phase thereby reducing the size of the downstream processing equipment (strip, scrub, crystallizer, etc.) and greatly enhancing the economics of the process.

Generally, the metallurgical organic phase to aqueous phase ratio will be fine tuned by routine experimentation to maximize the concentration of metal in the organic phase solution. In certain embodiments, the metallurgical organic phase to aqueous phase ratio of the organic phase to the acidic aqueous phase in the extraction step can be from 1:1000 to 10:1. In some embodiments, the metallurgical organic phase to aqueous phase ratio in the extraction step is preferably within the range of 1:100 to 10:1 or from 1:1 to 1:100.

In one embodiment of the invention, the organic phase recycle step is performed at least one time. In other embodiments, the organic phase recycle step is performed continuously. Preferably, the organic phase recycle step is performed until the concentration of molybdenum (or other target metal present in low concentration) in the organic phase solution is at least from 0.3 g/l to 25 g/l.

In other embodiments of the invention, the processes can further include one or more scrubbing steps performed by contacting at least part of the organic phase solution loaded with molybdenum with a mineral acid solution, thereby removing any impurities from the organic phase solution.

The aqueous phase strip solution of the process according to the present invention includes an inorganic compound chosen from: ammonia, ammonium hydroxide, ammonium salts, sodium hydroxide, sodium salts, molybdenum, and combinations thereof. In some embodiments, the ammonium and sodium salts are chosen from: carbonate, bicarbonate, sulfate, phosphate, chloride, and combinations thereof. In certain preferred embodiments, the inorganic compound of the aqueous phase strip solution is ammonium hydroxide blended with an ammonium salt chosen from: carbonate, sulfate, phosphate, and combinations thereof.

The concentration of the inorganic compound of the make-up feed in the stripping step is preferably as high as possible in order to minimize the dilution effect of its addition to the aqueous phase strip solution. Concentrated $NH_4OH$ or gaseous $NH_3$ is preferably used in certain embodiments. The pH of the aqueous phase strip solution ranges from 5 to 11.

In those embodiments where ammonia or ammonium hydroxide is the inorganic compound used as the strip reagent in the aqueous phase strip solution, the amount of ammonia transferred to the organic phase solution containing the metal must be suitably low to avoid phase disengagement and water transfer issues. Applicants have advantageously and surprisingly found that for metals requiring an ammoniacal strip the concentration of $NH_3$ must be less than 1 M in order for the strip process to work on an industrial scale. The concentration of ammonia is calculated using the following form of the Henderson-Hasselbalch equation: $[NH_3]=[\text{total ammonia}]/(1+10^{pKa-pH})$, where [total ammonia] can also be expressed as $[NH_3]+[NH_4]$ and the $pK_a$ of ammonium is 9.244. This equation is used in the Examples herein, which contrast the successful processes according to the present invention to those of the prior art.

In certain embodiments, the processes for recovering molybdenum from acidic aqueous solutions can further include a second recycling step performed by recycling from 5 to 100% of the aqueous phase strip solution containing molybdenum and contacting the aqueous phase strip solution with an organic phase solution containing molybdenum, thereby increasing or maintaining the concentration of molybdenum in the aqueous phase strip solution. In some embodiments, the percentage of the aqueous phase strip solution containing molybdenum that is subjected to the second recycling step is from 80 to 99.9%.

In other embodiments, the processes for recovering molybdenum from acidic aqueous solutions can include a second recycling step that includes flowing an aqueous phase strip solution in contact with an organic phase solution containing molybdenum, wherein the metallurgical organic phase to aqueous phase ratio is 1 to 1000, and setting an internal organic phase to aqueous phase ratio of 0.5 to 10 in the mixer, thereby resulting in uniform droplet size distribution and increasing or maintaining the concentration of molybdenum in the aqueous phase strip solution. Again, those of ordinary skill in the art will appreciate that uniform droplet size distribution is a resulting effect of good mixing characteristics of the organic phase solution and the aqueous phase solution, and that the second recycling step can be used to effectively concentrate the molybdenum (or any other target metal that is only present at low concentration) in the aqueous phase strip solution.

According to one embodiment of the invention, the metallurgical organic phase to aqueous phase ratio of organic phase solution to aqueous phase strip solution in the second recycle step is greater than 1. In other embodiments, the metallurgical organic phase to aqueous phase ratio of organic phase solution to aqueous phase strip solution in the second recycle step is preferably at least 2, more preferably at least 10, and most preferably at least 100.

Similar to the organic phase recycle step discussed above, in certain embodiments the aqueous phase strip solution recycle step is performed at least one time. In other embodiments, the aqueous phase strip solution recycle step is performed continuously. Preferably, the aqueous phase strip solution recycle step is performed until the concentration of molybdenum in the aqueous phase strip solution is at least from 5 g/l to 200 g/l, and preferably from at least 30 g/l to at least 80 g/l.

In the processes according to the present invention, an adequate amount of inorganic compound in the aqueous phase strip solution is used in order to: i) strip molybdenum from the organic phase solution, ii) give good phase disengagement properties (i.e., no emulsion or third-phase formation), and iii) result in a low concentration of inorganic compound being transferred into the organic phase solution. Additionally, phosphinic acid extractant losses in the aqueous phase strip solution can be minimized by reducing the amount of inorganic compound used for stripping and recycling the aqueous phase strip solution. The aqueous phase strip solution can be recycled to the stripping step wherein just a sufficient amount of fresh inorganic compound, such as ammonia or other selected inorganic compound, is added to the aqueous phase strip solution, thereby allowing further molybdenum stripping and allowing further concentration with minimal dilution in the aqueous phase strip solution.

As the molybdenum in the aqueous phase strip solution reaches saturation, molybdenum can precipitate out. Accordingly, in certain embodiments the stripping step is preferably done in a settler, preferably a conic settler. In some embodiments, the aqueous phase strip solution containing the molybdenum crystals may be transferred to a filter, centrifuge or other suitable equipment to separate the crystals from the pregnant strip liquor (saturated). Crystals may be washed with water or other suitable solvents to remove impurities.

In certain embodiments, molybdenum can be liberated from the aqueous phase strip solution via any suitable method known to those of ordinary skill in the art, including, for example: evaporation, acidification, organic solvents addition (i.e. ethanol addition), electro-winning, formation of other salts, precipitation, crystallization, and combinations thereof. In one embodiment, molybdenum is separated from the aqueous phase strip solution by in-situ precipitation.

The final molybdenum product can be one of many salts derived from the inorganic compound or compounds used for stripping, and may be further processed via multiple routes dependent on the final molybdenum product desired.

In certain embodiments of the processes according to the invention, the organic phase obtained after stripping molybdenum may be further treated in a subsequent scrub step and/or second stripping step in order to strip a second metal (different from molybdenum) from the organic phase solution by using a second aqueous phase strip solution containing an inorganic compound that is specific for stripping the target second metal. In some embodiments, this process is repeated to strip a third or fourth metal from the organic phase using compounds that are specific for stripping the targeted metals.

The metals that can be stripped in a further stripping step include those chosen from: main metals, transition metals, alkali metals, alkaline earth metals, metalloids, rare earth metals, lanthanides, actinides, semi-metals, and semi-conductors. Those of ordinary skill in the art will readily recognize these groups from the periodic table of elements and recognize the elements encompassed by them. In some embodiments, the preferred metals include, but are not limited to, uranium, aluminum, indium, scandium, gallium, bismuth, arsenic, tellurium, selenium, lithium, magnesium, and technetium.

In one embodiment, for example, uranium can be back extracted from the organic phase solution with a second aqueous phase strip solution containing a compound chosen from: phosphoric acid, ammonium carbonate, 1-hydroxyethane-1,1-diphosphonic acid, sodium carbonate, oxalic acid, and combinations thereof.

In certain embodiments of processes according to the invention, following the one or more stripping steps, the organic phase solution is advantageously at least partially recycled back to the extraction step. In various embodiments, the concentration of metals entering the extraction step(s) will be at a steady state with the concentration of metals exiting the SX operation via the stripping step(s).

Thus, the processes according to the present invention as described above permit the recovery of molybdenum and/or other value metals (e.g., uranium) present in acidic aqueous solutions from a large range of concentrations: from ppm to grams per liter via a solvent extraction process. The solvent extraction processes according to the invention utilize phosphinic acid reagents and mitigate the amount of ammonium or sodium transferred into the organic phase, which minimizes strip reagent losses, acid consumption, salt build up and extractant losses without emulsion or third phase formation.

The processes provided herein permit the recovery of other value metals such as uranium in addition to molybdenum through selective stripping of the organic phase. Other advantages of the processes according to the invention include the ability to extract and concentrate metals present only in low concentration from aqueous feed solutions and the ability to produce a metal product largely free of impurity elements.

Accordingly, in another aspect the invention provides a solvent extraction process for recovering metals from aqueous solutions, wherein the metal is present in the aqueous solution at a low concentration by contacting the aqueous solution with an organic phase solution, thereby extracting at least part of the metal from the aqueous phase; and recycling from 50-100% of the organic phase solution containing the metal and contacting the organic phase with an aqueous solution containing the metal, thereby increasing or maintaining the concentration of the metal in the organic phase; contacting the organic phase solution containing metal with an aqueous phase strip solution comprising a compound that back-extracts the metal, thereby stripping at least part of the metal from the organic phase solution to the aqueous phase strip solution; and separating the metal from the aqueous phase strip solution, thereby recovering the metal.

The metals targeted for recovery include any of those discussed above and generally include those metal elements corresponding to the periodic table groups of main metals, transition metals, alkali metals, alkaline earth metals, metalloids, rare earth metals, lanthanides, actinides, semi-metals, and semi-conductors.

In certain embodiments, the recycling step includes flowing an aqueous phase solution in contact with an organic phase solution wherein the metallurgical organic phase to aqueous phase ratio is 0.001 to 0.20, and setting an internal organic phase to aqueous phase ratio of 0.5 to 2.0 in the mixer, thereby resulting in uniform droplet size distribution and increasing or maintaining the concentration of metal in the organic phase solution.

In some embodiments, the process further includes a second recycling step comprising recycling from 5-100% of the aqueous phase strip solution containing the metal and contacting the aqueous phase strip solution with an organic phase solution containing the metal, thereby increasing or maintaining the concentration of the metal in the aqueous phase strip solution. In certain embodiments, the second recycling step includes flowing an aqueous phase strip solution in contact with an organic phase solution containing the metal wherein the metallurgical organic phase to aqueous phase ratio is 1 to 1000, and setting an internal organic phase to aqueous phase ratio of 0.5 to 10 in the mixer, thereby resulting in uniform droplet size distribution and increasing or maintaining the concentration of the metal in the aqueous phase strip solution. In some embodiments, the second recycle step is performed continuously.

The metal present only in low concentration in the aqueous feed stream is typically present in the range of from 1 ppm to 1,000 ppm (i.e., 1 g/l). In certain embodiments, the combined concentration factor of performing the extraction, organic recycle, and stripping steps is from 20 to 10,000×.

In certain embodiments, the process for recovering a metal present only in low concentration is performed as part of an existing metal solvent extraction operation. In other embodiments, the process for recovering a metal present only in low concentration is performed following the extraction of a different metal, typically at higher concentration (i.e., a major metal).

In the present invention, extraction and stripping may be carried out in mixer settlers, columns, centrifuges, static mixers, reactors or other suitable contacting/separation equipment. The process may contain one or more extraction stages, one or more stripping stages, and may or may not include one or more wash/scrub stages to remove impurities and reduce entrainment contamination. These stages can readily be arranged in any particular order by one of ordinary skill in the art without undue experimentation to suit the needs of the particular application and/or process. The metals present only in low concentration can be separated from the aqueous phase strip solution by any of those methods previously discussed above or known to those of ordinary skill in the art.

The solvent extraction plant performing the processes according to the invention can be configured for series, modified-series, series-parallel, modified series parallel, parallel, or interlaced series parallel operation for each section of the SX circuit (i.e. extraction section, scrub/wash section, and the stripping section). Alternatively, the extraction, scrubbing and stripping stages may be done on a batch basis.

According to one embodiment of the process according to the invention, the process is a continuous process.

According to another embodiment of the process according to the invention, the extraction step and recycling step are run on a continuous basis, and the stripping step is performed in a batch process. In certain embodiments, extraction, stripping and recycling stages are all performed on a continuous basis.

The processes according to the invention are now described in further detail in conjunction with FIG. 1, which represents a flow sheet illustrating the process according to one embodiment of the invention. Referring to FIG. 1, an aqueous feed solution containing metal (1) is optionally acidified with a mineral acid (2) and then flowed to an extraction mixer where it is contacted with an organic phase solution, which extracts the metal from the aqueous feed solution (Extraction Stage). The spent aqueous feed solution (or raffinate) (3) exits the extraction stage or it can enter a second extraction stage (not depicted). An optional scrubbing step (not depicted) can be introduced before or after the extraction stage. A fraction of the organic phase now loaded with the metal (5) is then flowed to a stripping apparatus where it is contacted with an aqueous stripping solution, which back extracts the metal from the organic phase solution (Stripping Stage). The remaining fraction of the organic phase solution (4) can be recycled/recirculated on a continuous or partial basis. The stripped organic phase (6) returns to the mixer of the Extraction Stage or it can be flowed to optional scrubbing and/or further stripping stages for stripping other metals (not depicted). A fraction of the aqueous phase stripping solution (8) is recycled/recirculated and additional make-up of the aqueous phase stripping solution (7) is added as needed. Part of the aqueous stripping solution (if continuous) or the entire aqueous stripping solution (if batch) can be further processed for metal recovery (9) such as by an additional evaporation/crystallization step (not depicted).

Other Embodiments

1. A process for recovering molybdenum from an acidic aqueous solution containing molybdenum, the process comprising:

a) contacting the aqueous solution with an organic phase solution comprising a phosphinic acid, thereby extracting at least part of the molybdenum from the aqueous phase to the organic phase;

b) contacting the organic phase with an aqueous phase strip solution comprising an inorganic compound and having a pH from 5 to 11, thereby stripping at least part of the molybdenum from the organic phase to the aqueous phase strip solution, with the proviso that when the inorganic compound is NH4OH, the concentration of free ammonia is from 0.01 mM to 1.0 M; and c) separating the molybdenum from the aqueous phase strip solution, thereby recovering molybdenum.

2. A process according to embodiment 1, wherein the organic phase solution further comprises a modifier comprising a functional group chosen from: phenols; aromatic esters; aliphatic esters; organophosphorus compounds; phosphates; phosphine oxides; aromatic aliphatic alcohols; aliphatic alcohols; nitriles; ketones; amides; carbamates; sulfoxides; ureas; carbonates; oximes; ethers; polyethers; ester-ethers; salts chosen from amines, phosphonium, ammonium, imidazolium, sulfonium, and pyridinium; and combinations thereof.

3. A process according to embodiment 2, wherein the functional group of the modifier is chosen from C8-C24 alcohols, aromatic esters, aliphatic esters, phosphates, phosphine oxides, and combinations thereof.

4. A process according to embodiment 2 or embodiment 3, wherein the functional group of the modifier is chosen from: tridecanol, 2,2,4-trimethyl-1,3-pentanediol diisobutyrate, tributylphosphate, trialkylphosphine oxide, and combinations thereof.

5. A process according to any one of the preceding embodiments further comprising recycling from 5 to 100% of the organic phase solution containing molybdenum of step (a) and contacting the organic phase with an acidic aqueous solution containing molybdenum, thereby increasing or maintaining the concentration of molybdenum in the organic phase.

6. A process according to embodiment 5, wherein the percentage of the organic phase containing molybdenum that is subjected to the recycling step is from 80 to 99.9%.

7. A process according to any one of embodiments 5-6, wherein the recycling step comprises flowing an aqueous phase solution in contact with an organic phase solution wherein the metallurgical O/A is 0.001 to 0.20, and setting an O/A of 0.5 to 2.0 in the mixer, thereby resulting in uniform droplet size distribution and increasing or maintaining the concentration of molybdenum in the organic phase solution.

8. A process according to any one of embodiments 5-7, wherein the recycling step is repeated at least once.

9. A process according to any one of embodiments 5-7 wherein the recycling step is continuous.

10. A process according to any one of embodiments 5-9, wherein the recycling step is performed until the concentration of molybdenum in the organic phase solution is at least from 0.3 g/L to 25 g/L.

11. A process according to any one of the preceding embodiments further comprising one or more scrubbing steps performed by contacting at least part of the organic phase solution loaded with molybdenum with a mineral acid solution, thereby removing any impurities from the organic phase solution.

12. A process according to any one of the preceding embodiments further comprising a second recycling step comprising recycling from 5 to 100% of the aqueous phase strip solution containing molybdenum of step (b) and contacting the aqueous phase strip solution with an organic phase solution containing molybdenum, thereby increasing or maintaining the concentration of molybdenum in the aqueous phase strip solution.

13. A process according to embodiment 12, wherein the percentage of the aqueous phase strip solution containing molybdenum that is subjected to the second recycling step is from 80 to 99.9%.

14. A process according to any one of embodiments 12-13, wherein the second recycling step comprises flowing an aqueous phase strip solution in contact with an organic phase solution containing molybdenum, wherein the metallurgical organic phase to aqueous phase ratio is 1 to 1000, and setting an internal organic phase to aqueous phase ratio of 0.5 to 10 in the mixer, thereby resulting in uniform droplet size distribution and increasing or maintaining the concentration of molybdenum in the aqueous phase strip solution.

15. A process according to any one of embodiments 12-14, wherein the second recycling step is repeated at least once.

16. A process according to any one of embodiments 12-14, wherein the second recycling step is continuous.

17. A process according to any one of embodiments 12-16, wherein the second recycling step is performed until the concentration of molybdenum in the aqueous phase strip solution is at least from 5.0 g/L to 200 g/L.

18. A process according to embodiment 17, wherein the concentration of molybdenum in the aqueous phase strip solution is at least from 30 g/L to 80 g/L.

19. A process according to any one of the preceding embodiments, wherein the concentration of molybdenum entering the extraction step is at a steady state with the concentration of molybdenum exiting the stripping step.

20. A process according to any one of the preceding embodiments, wherein the acidic aqueous solution containing molybdenum is chosen from: raffinate from a copper extraction process; scrub liquor from acid plants/smelting operations; leach solutions obtained from a source chosen from: solvent extraction operations, filter cakes, molybdenum oxide ores, processing of flue dusts, reprocessing of spent catalysts, and lubricant waste; and combinations thereof.

21. A process according to any one of the preceding embodiments, wherein the phosphinic acid is chosen from a compound represented by:

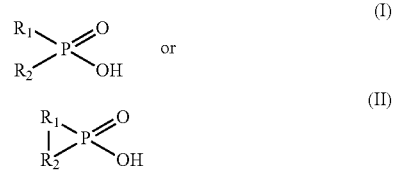

wherein $R_1$ and $R_2$ are individually chosen from $C_1$-$C_{30}$ alkyl, $C_3$-$C_{30}$ cycloalkyl, $C_3$-$C_{30}$ alkoxyalkyl, $C_4$-$C_{30}$ alkylcyclo, $C_7$-$C_{30}$ alkylaryl, $C_7$-$C_{30}$ aralkyl, and $C_8$-$C_{30}$ cycloalkylaryl radicals that are optionally substituted.

22. A process according to embodiment 21, wherein R1 and R2 are independently chosen from $C_4$-$C_{12}$ alkyl.

23. A process according to embodiment 21 or embodiment 22, wherein the phosphinic acid is chosen from: dimethyl phosphinic acid; diethyl phosphinic acid; di-n-propyl phosphinic acid; diisopropyl phosphinic acid; di-n-butyl phosphinic acid; diisobutyl phosphinic acid; di-n-pentyl phosphinic acid; di-n-hexyl phosphinic acid; di-n-heptyl phosphinic acid; di-n-octyl phosphinic acid; di-n-nonyl phosphinic acid; di-n-decyl phosphinic acid; di-n-dodecyl phosphinic acid; di-n-tetradecyl phosphinic acid; di-n-hexadecyl phosphinic acid; di-n-eicosyl phosphinic acid; di-norbornyl phosphinic acid; bis(2,4,4-trimethylpentyl)-phosphinic acid; (2,4,4-trimethylpentyl)cyclohexyl phosphinic acid; (2,4,4-trimethylpentyl)octyl phosphinic acid; (2,4,4-trimethylpentyl)(1,1,3,3-tetramethylbutyl)phosphinic acid; (1,1,3,3-tetramethylbutyl)(2-ethylhexyl)phosphinic acid; (2,4,4-trimethylpentyl)(2-ethylhexyl)phosphinic acid; (2,4,4-trimethylpentyl)(1-methyl-1-ethylpentyl)

phosphinic acid; (1-methyl-1-ethylpentyl)(2-ethylhexyl) phosphinic acid; dicyclopentyl phosphinic acid; dicyclohexyl phosphinic acid; dicyclooctyl phosphinic acid; cyclohexyl, n-butyl phosphinic acid; cyclopentyl, n-dodecyl phosphinic acid; cyclooctyl ether phopshinic acid; 2,4,6-triisopropyl-1,3,5-dioxophosphorinane, 5-hydroxy, 5-oxide phosphinic acid; cyclohexyl, phenyl phosphinic acid; cyclopentyl-p-tolyl phosphinic acid; cyclooctyl-p-chlorophenyl phosphinic acid, diphenyl phosphinic acid; di-o-tolyl phosphinic acid; di-m-tolyl phosphinic acid; di-p-tolyl phosphinic acid; bis(2,3-dimethylphenyl) phosphinic acid; bis(2,4-dimethylphenyl) phosphinic acid; bis(2,5-dimethylphenyl) phosphinic acid; bis(2,6-dimethylphenyl) phosphinic acid; bis(3,4-dimethylphenyl) phosphinic acid; bis(3,5-dimethylphenyl) phosphinic acid; di-(p-ethylphenyl) phosphinic acid; di-(p-octylphenyl) phosphinic acid; ethylphenyl, n-butylphenyl phosphinic acid; n-octylphenyl, n-hexadecylphenyl phosphinic acid; ethyl-o-tolyl phosphinic acid; n-octyl-p-tolyl phosphinic acid; bis(o-chlorophenyl) phosphinic acid; bis(m-chlorophenyl phosphinic acid; bis(p-chlorophenyl) phosphinic acid; methyl-o-chlorophenyl phosphinic acid; n-propyl-p-chlorophenyl phosphinic acid, n-dodecyl-p-chlorophenyl phosphinic acid; dibenzyl phosphinic acid; methyl-naphtyl phosphinic acid; diallyl phosphinic acid; cyclohexyl, 1-hydroxycyclohexyl phosphinic acid; bis(2-methyl-1-hydroxypentyl) phosphinic acid; benzyl, alphahydroxybenzyl phosphinic acid; o-chlorobenzyl, alpha-hydroxy-o-chlorobenzyl phosphinic acid; p-chlorobenzyl, alpha-hydroxy-p-chlorobenzyl phosphinic acid; phenyl, alpha-methylbenzyl phosphinic acid; cyclopentyl, 1-hydroxycyclopentyl phosphinic acid; alpha-methylbenzyl, alpha-hydroxy-alpha-methylbenzyl phosphinic acid; 1-methylpentyl, 1-hydroxy-1-methylpentyl phosphinic acid; n-octyl, alpha hydroxybenzyl phosphinic acid; (1-hydroxy-1 methylethyl)isopropyl phosphinic acid; and combinations thereof.

24. A process according to any one of embodiments 21-23, wherein the phosphinic acid is chosen from: bis(2,4,4-trimethylpentyl)-phosphinic acid; (2,4,4-trimethylpentyl)(1,1,3,3-tetramethylbutyl)phosphinic acid; (1,1,3,3-tetramethylbutyl)(2-ethylhexyl)phosphinic acid; (2,4,4-trimethylpentyl)(2-ethylhexyl)phosphinic acid; (2,4,4-trimethylpentyl)(1-methyl-1-ethylpentyl)phosphinic acid; (1-methyl-1-ethylpentyl)(2-ethylhexyl)phosphinic acid; and combinations thereof.

25. A process according to any of the preceding embodiments, wherein the concentration of the phosphinic acid in the organic phase is from 0.01 mol/L to 1.5 mol/L.

26. A process according to embodiment 25, wherein the concentration of phosphinic acid is from 0.05 mol/L to 0.8 mol/L.

27. A process according to embodiment 25 or embodiment 26, wherein the concentration of phosphinic acid is from 0.2 mol/L to 0.6 mol/L.

28. A process according to any of the preceding embodiments, wherein the inorganic compound of the aqueous phase strip solution is chosen from: ammonia, ammonium hydroxide, ammonium salts, sodium hydroxide, sodium salts, molybdenum, and combinations thereof.

29. A process according to embodiment 28, wherein the ammonium and sodium salts are chosen from: carbonate, bicarbonate, sulfate, phosphate, chloride, and combinations thereof.

30. A process according to embodiment 28 or embodiment 29, wherein the inorganic compound of the aqueous phase strip solution is ammonium hydroxide blended with an ammonium salt chosen from: carbonate, sulfate, phosphate, and combinations thereof.

31. A process according to any one of the preceding embodiments, wherein separating step (c) is performed by a method chosen from: evaporation; acidification; electrowinning; crystallization; organic solvent addition; precipitation; and combinations thereof.

32. A process according to embodiment 31, wherein the separating step is performed by in-situ precipitation.

33. A process according to any of the preceding embodiments further comprising stripping a second metal from the organic phase solution with a second aqueous phase strip solution comprising a compound that is specific for stripping the second metal.

34. A process according to embodiment 31, wherein the second metal is chosen from: main metals, transition metals, alkali metals, alkaline earth metals, metalloids, rare earth metals, lanthanides, actinides, semi-metals, and semi-conductors.

35. A process according to embodiment 33 or embodiment 34, wherein the metal is uranium and wherein the compound in the second aqueous phase strip solution is chosen from: 1-hydroxyethane-1,1-diphosphonic acid; sodium carbonate; ammonium carbonate; oxalic acid; phosphoric acid; and combinations thereof.

36. A process according to any of the preceding embodiments further comprising recycling the stripped organic phase solution to the extracting step (a).

37. A solvent extraction process for recovering metals from aqueous solutions, wherein the metal is present in the aqueous solution at a low concentration, the process comprising:

a) contacting the aqueous solution with an organic phase solution, thereby extracting at least part of the metal from the aqueous phase; and recycling from 50-100% of the organic phase solution containing the metal and contacting the organic phase with an aqueous solution containing the metal, thereby increasing or maintaining the concentration of the metal in the organic phase;

b) contacting the organic phase solution containing metal with an aqueous phase strip solution comprising a compound that back-extracts the metal, thereby stripping at least part of the metal from the organic phase solution to the aqueous phase strip solution; and c) separating the metal from the aqueous phase strip solution, thereby recovering the metal.

38. A process according to embodiment 37, wherein the recycling step comprises flowing an aqueous phase solution in contact with an organic phase solution wherein the metallurgical organic phase to aqueous phase ratio is 0.001 to 0.20, and setting an internal organic phase to aqueous phase ratio of 0.5 to 2.0 in the mixer, thereby resulting in uniform droplet size distribution and increasing or maintaining the concentration of metal in the organic phase solution.

39. A process according to embodiment 37 or embodiment 38 further comprising a second recycling step comprising recycling from 5-100% of the aqueous phase strip solution containing the metal and contacting the aqueous phase strip solution with an organic phase solution containing the metal, thereby increasing or maintaining the concentration of the metal in the aqueous phase strip solution.

40. A process according to embodiment 39, wherein the second recycling step comprises flowing an aqueous phase strip solution in contact with an organic phase solution containing the metal wherein the metallurgical organic phase to aqueous phase ratio is 1 to 1000, and setting an internal organic phase to aqueous phase ratio of 0.5 to 10 in the mixer, thereby resulting in uniform droplet size distribution and increasing or maintaining the concentration of the metal in the aqueous phase strip solution.

41. A process according to any one of embodiments 37-40, wherein the concentration of metal in the aqueous solution is from 1 ppm to 1,000 ppm.

42. A process according to any one of embodiments 37-41, wherein the combined concentration factor from steps (a) and (b) is from 20 to 10,000.

43. A process according to any one of embodiments 37-42, wherein the process is performed following a major metal extraction.

44. A process according to any one of embodiments 39-43, wherein the second recycle step is continuous.

45. A process according to any one of embodiments 37-44 further comprising one or more scrubbing steps performed by contacting at least part of the organic phase containing the metal with a mineral acid solution, thereby removing any impurities from the organic phase solution.

46. A process according to any one of embodiment 37-45, wherein the separating step (c) is performed by a method chosen from: evaporation; acidification; electro-winning; crystallization; organic solvent addition; precipitation; and combinations thereof.

47. A process according to any one of embodiment 37-46, wherein the metal is chosen from: main metals, transition metals, alkali metals, alkaline earth metals, metalloids, rare earth metals, lanthanides, actinides, semi-metals, and semi-conductors.

EXAMPLES

The following examples are provided to assist one ordinarily skilled in the art to further understand certain embodiments of the present invention. These examples are intended for illustration purposes only and are not to be construed as limiting the scope of the claims of the present invention.

Example 1

0.1 M phosphinic acid reagent bis(2,4,4-trimethylpentyl)-phosphinic acid dissolved in ORFORM®-SX 7 solvent is used as the organic phase. The aqueous phase used in this example is a synthetic aqueous solution containing 1.6 g/l Cu, 4 g/l Fe, 6.5 g/l Al, 25 ppm Co and 25 ppm Mo and the pH is adjusted to 1.06 using sulfuric acid. All the metals used to make the synthetic aqueous solution are sulfate salts. Equal volumes of organic and aqueous phases are magnetically stirred for 30 min and both phases are sampled for Inductive Coupled Plasma Optical Emission Spectroscopy (ICP-OES) analysis. The pH of the aqueous phase is adjusted to 0.95 using sulfuric acid and the biphasic system is magnetically stirred for 30 minutes and sampled for ICP-OES analysis. The procedure is repeated at different pH values (pH=0.65, pH=0.43, and pH=0.03). The results are used to calculate the percentage of metals extracted in the organic phase shown in Table 1 and indicate that molybdenum is preferentially extracted by phosphinic acid. Molybdenum extraction decreases only very slightly with decreasing the pH indicating that molybdenum can be extracted from very acidic media. Aluminum extracted in the organic phase is less than 0.5 ppm. Iron extraction is minimal and decreases with decreasing the pH, Table 1.

TABLE 1

| pH | % Cu extraction | % Mo extraction | % Fe extraction | % Al extraction | % Ca extraction | % Co extraction | % Mn extraction | % Zn extraction |
|---|---|---|---|---|---|---|---|---|
| 1.06 | 0.00 | 91.07 | 3.92 | 0.01 | 9.88 | 0.00 | 0.00 | 0.00 |
| 0.95 | 0.00 | 91.04 | 2.52 | 0.01 | 2.58 | 0.00 | 0.00 | 0.00 |
| 0.65 | 0.00 | 88.81 | 1.50 | 0.01 | 1.07 | 0.00 | 0.00 | 0.00 |
| 0.43 | 0.00 | 88.42 | 0.91 | 0.01 | 3.81 | 0.00 | 0.00 | 0.00 |
| 0.03 | 0.00 | 85.61 | 0.38 | 0.00 | 0.00 | 0.00 | 0.00 | 0.00 |
| 0.03 | 0.00 | 84.98 | 0.34 | 0.00 | 0.00 | 0.00 | 0.00 | 0.00 |

Example 2

Phosphinic acid reagent in ORFORM® SX-7 with 1.5% modifier and without modifier is loaded at a 1:2 metallurgical O/A ratio with an aqueous feed solution containing 4.8 g/l Mo, 2.7 g/l Fe, 6.3 g/l Al, 0.6 g/l Cu and a pH=0.4. The biphasic system is magnetically stirred 1 hour and then the phases are separated, filtered through phase separating paper (the organic phase) and regular filter paper (the aqueous phase) and the two phases are analyzed by ICP-OES. The organic phases are subsequently used for stripping experiments. The stripping solution consists of an aqueous solution containing 0.5 M $NH_4OH$/0.25 M $(NH_4)_2CO_3$. The organic loading from the aqueous analysis indicates about 5 g/l Mo in the organic phase.

Table 2 shows the molybdenum loading on the organic phase after extraction.

TABLE 2

| Modifier | Mo, org, ppm |
|---|---|
| Tridecanol | 5,029 |
| Alfol 1012 | 5,010 |
| Alfol 1014 | 5,022 |
| TXIB | 5,325 |
| No modifier | 5,587 |

The results in Table 2 show that the addition of modifier only slightly reduces molybdenum loading—however its addition greatly enhances the phase disengagement properties. The strip solution is 0.5 M $NH_4OH$/0.25 M $(NH_4)_2CO_3$. The organic phases from the extraction example and stripping aqueous solutions are mixed using a vortex mixer two times each for 2.5 minutes and the phase disengagement behaviour is monitored. The results obtained from the stripping experiments are presented, in Table 3. The aqueous portion is carefully separated and filtered through regular filter paper and analyzed by ICP-OES. The results are used to calculate molybdenum percentage stripped and concentration of molybdenum in the strip phase.

TABLE 3

(0.5M NH$_4$OH, 0.25M (NH$_4$)$_2$CO$_3$)

| Modifiers | O:A | NH$_3$/Mo molar ratio | Phase disengagement | Phase disengagement (organic/aqueous) | Mo stripped, % | Mo conc. in stripping phase ppm |
|---|---|---|---|---|---|---|
| Tridecanol | 5 | 3.82 | slow | very cloudy/clear | 95.2 | 23,940 |
| Tridecanol | 10 | 1.92 | fast | clear/clear | 79.6 | 40,040 |
| Tridecanol | 15 | 1.28 | fast | clear/clear | 77.5 | 58,463 |
| Alfol 1012 | 5 | 3.82 | slow | very cloudy/clear | 93.0 | 23,296 |
| Alfol 1012 | 10 | 1.92 | fast | clear/clear | 87.3 | 43,755 |
| Alfol 1012 | 15 | 1.28 | fast | clear/clear | 81.8 | 61,448 |
| Alfol 1014 | 5 | 3.82 | slow | very cloudy/clear | 95.9 | 24,090 |
| Alfol 1014 | 10 | 1.92 | fast | clear/clear | 88.1 | 44,240 |
| Alfol 1014 | 15 | 1.28 | fast | clear/clear | 89.1 | 67,132 |
| TXIB | 5 | 3.82 | slow | very cloudy/clear | 81.5 | 21,689 |
| TXIB | 10 | 1.92 | slow | cloudy/clear | 85.2 | 45,390 |
| TXIB | 15 | 1.28 | fast | clear/clear | 79.6 | 63,607 |
| No modifier | 5 | 3.82 | slow | very cloudy/clear | 92.3 | 25,785 |
| No modifier | 10 | 1.92 | slow | cloudy/clear | 76.7 | 42,844 |
| No modifier | 15 | 1.28 | fast | clear/clear | 81.1 | 67,963 |

The results in Table 3 shows that the phase disengagement time and phase appearance improves when modifiers are used. Thus, the addition of modifiers slightly reduces the extraction of molybdenum into the organic phase while improving the two phase appearance.

Example 3

A raffinate from a Cu SX plant is adjusted to a pH=0.43 with sulphuric acid and contacted with 0.1 M phosphinic acid reagent in ORFORM® SX-7 at a metallurgical O:A=1. The sample contains 5.7 g/l Al, 0.65 g/l Cu, 4.7 g/l Fe, 63 ppm Mo, 9 ppm V, 33 ppm U, 10.3 ppm Ti and other metals as shown in Table 4. The biphasic system is magnetically stirred for 30 min, phase separated and the organic phases are sampled for ICP-OES analysis. The organic phase is contacted with a fresh aqueous solution at the same metallurgical O:A ratio (1:1), equilibrated under magnetic stirring and the organic phase is sampled for ICP-OES analysis. This procedure is repeated and the organic samples are analyzed by ICP-OES. The results are presented in Table 5 and show that molybdenum is concentrated in the organic phase. Uranium is also extracted and follows the same trend. On the other hand, the concentration of iron in the organic phase did not change significantly during the extraction. Thus, the extractant is selective for the desired metals (target metals).

TABLE 4

| Component | Concentration, ppm |
|---|---|
| Al | 5,705 |
| As | 18 |
| Ca | 442 |
| Co | 27 |
| Cu | 650 |
| Fe | 4,689 |
| K | 601 |
| Mg | 2,742 |
| Mn | 1,239 |
| Mo | 63 |
| Na | 6,235 |
| Ni | 9 |
| P | 703 |
| Si | 97 |
| Sr | 18 |
| V | 9 |

TABLE 4-continued

| Component | Concentration, ppm |
|---|---|
| Zn | 318 |
| U | 33 |

TABLE 5

Concentration of Extracted Metals in the Organic Phase

| Sample | Fe (ppm) | Mo (ppm) | Ti (ppm) | U (ppm) |
|---|---|---|---|---|
| 1$^{st}$ extraction | 58.2 | 66.9 | 4.6 | 16.2 |
| 2$^{nd}$ extraction | 51.6 | 109.8 | 6.6 | 31.2 |

Example 4

An organic solution containing 0.1 M phosphinic acid reagent in ORFORM® SX-7 is contacted with a synthetic raffinate containing 6.3 g/l Al, 0.6 g/l Cu, 2.7 g/l Fe and 4.9 g/l Mo at a metallurgical organic phase to aqueous phase ratio of 0.5. The biphasic system is magnetically stirred for 30 minutes and the organic phase is further used for the stripping stage. The organic phase obtained after extraction is contacted with a 3 M NH$_4$OH solution at a metallurgical organic phase to aqueous phase ratio of 45. Upon the contact of the organic phase and aqueous phase, a white precipitate starts dropping out of solution. The biphasic system is magnetically stirred for 10 minutes and the solids are filtrated and analyzed via X-ray diffraction. The analysis indicates that the precipitate is ammonium heptamolybdate.

Example 5

A continuous rig using an internal organic phase to aqueous phase ratio of 1 and 100% organic recycle is performed in order to extract and concentrate molybdenum in the organic phase. The aqueous phase is a raffinate from a Cu SX circuit, spiked with ammonium molybdate which has a pH of 1.13. Atomic absorption ("AA") analysis of the aqueous phase gives the following results: 0.24 g/l Cu, 93 ppm Mo, 0.21 g/l Fe. The EMF of the aqueous solution is 502 mV. The organic phase consists of 10 vol % phosphinic acid reagent in ORFORM® SX-12. The continuous rig configuration is run for 40 hrs, after which the organic phase is analyzed by AA. The results indicate 3.88 g/l Mo in the organic phase and 43 ppm Mo in the raffinate. Accordingly, the example shows the molybdenum can be efficiently recovered from a low concentration aqueous feed source and concentrated more than forty times in the extraction step.

The use of 28% $NH_4OH$ (O/A=1) for stripping molybdenum from the loaded organic led to emulsion formation. By using 15% $H_2SO_4$ (O/A=1), 56 ppm Mo is stripped from the organic phase. This indicates that sulfuric acid is not an efficient reagent by which to strip molybdenum.

Example 6

An acid plant effluent (scrub solution) is contacted with an organic phase containing phosphinic acid reagent to extract molybdenum. The contact results in a semi-stable emulsion. This same aqueous feed is then diluted with raffinate from a Cu SX circuit (one part of smelter scrub solution with 6 parts of raffinate) and the solution is extracted. Molybdenum concentration after dilution as measured by AA is 21 ppm. An organic phase containing phosphinic acid reagent in ORFORM® SX-12, is contacted with the diluted smelter scrub solution at a metallurgical O/A=1.25, equilibrated for 3 minutes and the aqueous phase is analyzed by AA. The aqueous phase is discharged and the organic phase is re-contacted with fresh aqueous feed solution and the aqueous phase is analyzed. This procedure is used for multiple contacts. The diluted smelter scrub solution shows no emulsion formation during the contact with the organic phase even after multiple contacts. The AA analysis as shown in Table 6 indicates that molybdenum is extracted even from low concentrations feed (21 ppm).

TABLE 6

Extraction examples using phosphinic acid reagent in ORFORM ® SX-7 and diluted smelter scrub solution.

| Experiment #1 | | Raffinate, Mo (ppm) | Comments |
|---|---|---|---|
| 2.5 Vol % Phosphinic acid reagent 1.25:1 O/A | Contact 1 | 10.3 | No emulsion |
| Drain Aq add fresh feed | Contact 2 | 8.5 | No emulsion |
| Drain Aq add fresh feed | Contact 3 | 9.4 | No emulsion |
| Drain Aq add fresh feed | Contact 4 | 7.6 | No emulsion |
| Drain Aq add fresh feed | Contact 5 | 7.5 | No emulsion |
| Drain Aq add fresh feed | Contact 6 | 8.9 | No emulsion |
| Drain Aq add fresh feed | Contact 7 | 9.5 | No emulsion |

The examples show molybdenum is efficiently concentrated from a dilute feed; dilution of the feed may at times be necessary.

Example 7

A continuous rig extraction system is completed using an actual copper raffinate solution spiked with ammonium molybdate to a final Mo concentration of 134 ppm and an organic phase that contains 10 vol % phosphinic acid reagent in ORFORM® SX-12. The metals analyzed by ICP-OES in the raffinate solution used are shown in Table 7. The pH of the aqueous phase is adjusted to 0.45 by using sulfuric acid.

TABLE 7

The composition of the aqueous feed solution

| Al, ppm | Ca, ppm | Cd, ppm | Co, ppm | Cu, ppm | Fe, ppm | Mg, ppm | Mn, ppm | Mo, ppm | Ni, ppm | Re, ppm | Zn, ppm |
|---|---|---|---|---|---|---|---|---|---|---|---|
| 6,000 | 490 | 7 | 49 | 162 | 513 | 3,879 | 1,194 | 134 | 38 | 1 | 297 |

The extraction stage is run with 100% organic phase recycle until a molybdenum concentration in the organic phase of 1.12 g/l is achieved (an 8.4× concentration).

Once the organic phase is loaded to 1.12 g/l Mo a side stream from the organic phase (15 ml/min) is transferred to the stripping stage. The aqueous phase stripping solution consists of 0.52 M $(NH_4)_2CO_3$ and 3.13 N $NH_4OH$ and is added at a flow rate corresponding to a metallurgical organic phase to aqueous phase ratio of 150:1. Within the system, aqueous recycle is utilized to achieve an internal organic phase to aqueous phase ratio of 10:1. The molybdenum in the aqueous stripping solution is concentrated to 34.5 g/l. The barren organic phase after Mo stripping is sampled at various times and analyzed by ICP-OES, Table 8.

TABLE 8

Metal concentrations in the organic phase after extraction and stripping in the continuous rig extraction system.

| Description | Time | Al (ppm) | Cu (ppm) | Fe (ppm) | Mg (ppm) | Mn (ppm) | Mo (ppm) | Ti (ppm) | U (ppm) |
|---|---|---|---|---|---|---|---|---|---|
| Extraction | 32 h | 27.3 | 0.6 | 13.5 | 1.4 | 6.3 | 1155.1 | 17.7 | 107.4 |
| Stripping | 27 h: 10 min | 21 | 1.3 | 16.8 | 61.6 | 10.9 | 327.3 | 17.5 | 106.5 |

The example shows that acidification of the feed allows for selective molybdenum extraction and high selectivity for Mo over Al, Fe, Cu, Mg, Mn. It also demonstrates a high molybdenum transfer from a dilute aqueous feed solution which results in an overall Mo concentration of 34.5 g/l from a 134 ppm feed, thereby achieving a concentration factor of 257. The results also show that a separation between molybdenum and uranium may be achieved.

After 6 hours of stripping, the organic phase is analyzed for ammonium content. A sample of the stripped organic phase from the continuous rig extraction system is contacted and equilibrated with 1N H2SO4 at metallurgical organic phase to aqueous phase ratio=0.25 two times. The aqueous phases are phase separated and sodium hydroxide is added to the aqueous phase until the solution becomes basic (pH=8). The sample is distilled using a Kjeldahl flask and 50 mL of 0.1 N HCl is used to collect any distilled ammonia. The hydrochloric acid is titrated with 0.1 N NaOH using methyl-orange as an indicator. 50 mL of 0.1 N NaOH is used to titrate the hydrochloric acid after distillation and indicates that the organic phase did not contain any ammonium salt.

Example 8

An organic phase containing 0.1 M phosphinic acid reagent in ORFORM® SX-12 is contacted with an aqueous feed solution containing 4.13 g/l Mo, 0.48 g/l Cu having a pH of 0.42 at a metallurgical organic phase to aqueous phase ratio=1. The two phases are equilibrated, allowed to separate, the aqueous is discarded and the organic is washed with water. The resulting washed organic is then contacted with an aqueous strip solution containing 6 g/l $NH_3$/15 g/l carbonate at a metallurgical organic phase to aqueous phase ratio=2.5. The two phases are equilibrated, allowed to separate, the stripped organic is washed with water to be used in another extraction/strip cycle. The aqueous strip solution from each sample is reused. The stripping solutions are analyzed by AA and the results indicate that Mo is concentrated to 15.46 g/l.

The last strip solution is distilled to remove ammonia and water to a Mo concentration of 101 g/l. Aliquots of the strip solution are then used in the following precipitation/crystallization examples.

Six milliliters is cooled down to 10° C. for 18 hr. resulting in ammonium molybdate crystallization.

Another 2 mL of that solution (pH=7) is acidified to pH 4.0 with sulfuric acid and white precipitate forms which is confirmed to contain molybdenum.

An aliquot of 2 mL of the solution is treated with reagent alcohol (95% ethanol and 5% methanol) until white precipitate is formed. The X-ray diffraction analysis of the white precipitate indicates the presence of ammonium heptamolybdate and ammonium octamolybdate.

Example 9

0.3M phosphinic acid reagent in ORFORM® SX-12 is loaded with a Cu SX raffinate. The loaded organic phase composition is shown in Table 9. The loaded organic phase is then scrubbed with an aqueous solution containing 100 g/l $H_2SO_4$ at a metallurgical organic phase to aqueous phase ratio of 1:1 before being sent to the stripping step. The aqueous solution is analyzed after scrubbing and the results shown in Table 9 indicate that a minimum amount of Mo (7.5 ppm) is scrubbed, but that iron is almost completely extracted into the scrubbing solution.

TABLE 9

Acid scrubbing results.

| Sample | Fe (ppm) | Mo (ppm) | U (ppm) |
| --- | --- | --- | --- |
| Loaded organic phase | 273.10 | 120.00 | 30.20 |
| Aqueous scrubbing solution (100 g/l H2SO4) | 255.00 | 7.50 | 0.00 |

Example 10

40 vol % phosphinic acid reagent in ORFORM® SX-12 loaded with 3 g/l Mo is contacted with aqueous ammonium hydroxide solutions of following concentrations: 0.6 mM, 50 mM, 0.15 M, 1M, and 3M at an O/A=1. The samples are magnetically stirred for 15 minutes and allowed to phase disengage. The observations are summarized in Table 10.

TABLE 10

Mo stripping results

| [NH4OH], | Phase disengagement time | | pH equilibrium | [NH$_4$OH]eq, | Stripping efficiency, % | [NH$_3$] free, M |
| --- | --- | --- | --- | --- | --- | --- |
| M | RT | 40° C. | RT | M | RT | [NH$_3$] free, M |
| 0.0006 | short | short | 3.06 | 0 | Not measured | 0 |
| 0.05 | short | short | 5.82 | 0.029 | Not measured | 0.00001 |
| 0.15 | short | short | 6.06 | 0.05 | 74 | 0.00003 |
| 1 | short | short | 8.22 | 0.1 | 98 | 0.0087 |
| 3 | long | long | 10.24 | 1.33 | Not measured | 1.2 |

Note:
short = less than about 3 min;
long = more than about 3 min

When the concentration of free ammonia is lower than 1.2 M the phase disengagement time is short. High concentrations of free ammonia (>1M) leads to very long phase disengagement times and the formation of a third phase. A [$NH_3$]=0.0087 M gives very high stripping efficiencies percentage. Thus, good phase disengagement properties and high stripping efficiencies can be obtained when the concentration of free ammonia is less than 1M.

Example 11

40 vol % phosphinic acid reagent in ORFORM® SX-12 loaded to 2.7 g/l Mo is contacted with 3M $NH_4OH$ adjusted to pH=6.37 with $H_2SO_4$ at a O/A=1. The sample is magnetically stirred for 15 minutes and allowed to phase disengage. The example is also performed at 40° C. The phase disengagement is short both at RT and 40° C. (<3 min).

Example 12

An organic solution containing 20 vol % phosphinic acid reagent in ORFORM® SX-12 and 1.6 g/l Mo is contacted with an aqueous phase stripping solution containing 0.8M ammonium phosphate, at an O/A=1. The pH of the aqueous phase is adjusted to 6.34 ($[NH_3]$free=0.9 mM) by addition of phosphoric acid. The sample is magnetically stirred for 60 minutes and the phases are analyzed via ICP-OES. Phase disengagement time is less than 1 minute. The stripping efficiency is 99.3%.

Example 13

Organic phase solution samples containing 40 vol % phosphinic acid reagent in ORFORM® SX-12 and 2.8 g/l Mo are contacted with aqueous phase stripping solutions containing 0.5 M NaOH, 0.5 M NaOH/10 gpl NaCl, and 0.5 M NaOH/10 gpl $Na_2CO_3$, respectively, at an O/A=1. The samples are magnetically stirred for 15 minutes and the phases are analyzed via ICP-OES. Phase disengagement time is short in all cases. The stripping efficiencies are higher than 99%, Table 11.

TABLE 11

Mo stripping efficiency

| Stripping conditions | Stripping efficiency, % |
|---|---|
| 0.5M NaOH | 99.91% |
| 0.5M NaOH, 10 gpl NaCl | 99.94% |
| 0.5M NaOH, 10 gpl $Na_2CO_3$ | 99.87% |

Example 14

An aqueous solution containing 2.77 gpl Mo, 0.032 gpl Fe, 14.3 gpl Al, 1.10 gpl Co, 0.18 gpl Ni is adjusted to a pH=0.9 using sulfuric acid. Samples of an organic phase containing 40 vol % phosphinic acid reagent in Exxol® D80 is contacted with the above aqueous solution at an O/A=1, magnetically stirred with 6 wt % aqueous ammonia and 0.36 M $NH_4OH$, respectively, at an O/A=1 (20 mL organic and 20 mL aq) at 40° C. The samples are magnetically stirred overnight at 40° C. In the sample containing 6 wt % aqueous ammonia, after the contact step, the volume of the aqueous sample decreases to 15 mL and the organic phase increases to 25 mL. The analysis of the organic phase after contact by Karl Fisher titration indicates 20% water in the organic phase in comparison with only 0.76% water in the organic phase for the sample containing 0.36 M $NH_4OH$, Table 12.

TABLE 12

Water content in the organic phase after Mo stripping

| Stripping solution | $[H_2O]$org, wt % | pH eq | $[NH_3]$free, M |
|---|---|---|---|
| 6 wt % aqueous NH3 | 20 | 11.75 | 2.6 |
| 0.36M $NH_4OH$ | 0.76 | 7.04 | 0.0004 |

Thus, the presence of 20% water in the organic phase after the contact step (when $[NH_3]$free=2.6 M) makes these stripping conditions unpractical. Also, the phase disengagement times are 122 seconds for 0.36 M $NH_4OH$ and 390 seconds for 6 wt % $NH_4OH$ indicating that a lower free ammonia concentration is needed for good phase disengagement properties.

Example 15

An aqueous raffinate from a Cu SX operation containing 38 ppm U is contacted with an organic phase solution containing 0.1 M phosphinic acid reagent in ORFORM® SX-12 at a O/A=0.33 and magnetically stirred for one hour. The organic phase is filtered through phase separating paper and used for the stripping stage. Loaded organic phase samples are contacted with aqueous phase stripping solutions shown in Table 13 at an O/A=1. The stripping examples using $FeSO_4$ are performed under nitrogen blanket. The aqueous samples are analyzed before and after the contact using ICP-OES and the results are used in calculating the stripping efficiency.

TABLE 13

Uranium stripping results

| EMF before | EMF after | Description | % U stripped |
|---|---|---|---|
|  |  | 2.5M $H_3PO_4$ | 88.75 |
| 148 | 165 | 2.5M $H_3PO_4$/5 gpl $Fe^{2+}$ | 85.67 |
| 137 | 154 | 2.5M $H_3PO_4$/10 gpl $Fe^{2+}$ | 86.06 |
|  |  | 2.5M $H_2SO_4$ | 66.30 |
| 332 | 373 | 2.5M $H_2SO_4$/5 gpl $Fe^{2+}$ | 65.66 |
| 335 | 363 | 2.5M $H_2SO_4$/10 gpl $Fe^{2+}$ | 70.37 |

Example 16

An organic phase solution containing 5-nonylsalicylaldoxime in ORFORM® SX-7 is contacted with an aqueous solution having a pH=1 and containing 26 ppm molybdenum. After 30 minutes the organic phase is separated and contacted again with fresh aqueous solution. The organic phases are analyzed for molybdenum content by ICP-OES. The results are shown in Table 14 and indicate that the concentration of molybdenum is increased in the organic phase in the second contact.

TABLE 14

Mo content in the organic phase after extraction

|  | [Mo]org, ppm |
|---|---|
| Contact 1 | 23.2 |
| Contact 2 | 41 |

Example 17

An organic phase solution containing 50 gpl 5-nonylsalicylaldoxime in ORFORM® SX-11 loaded with 5.4 gpl Cu is contacted with an aqueous strip solution containing 180 gpl $H_2SO_4$ at an O/A=1. The aqueous phase strip solution is re-contacted with a fresh loaded organic phase. The procedure is repeated five more times. The aqueous phase strip solutions are analyzed by ICP-OES after the contact step and are shown in Table 15. The results indicate that Cu can be concentrated in the aqueous phase by recycling the aqueous phase stripping solution.

TABLE 15

Cu concentration in the aqueous strip solution after each contact.

|  | [Cu], gpl |
|---|---|
| Contact 1 | 2.4 |
| Contact 2 | 4.5 |
| Contact 3 | 6.9 |
| Contact 4 | 9.2 |
| Contact 5 | 11.6 |
| Contact 6 | 13.1 |
| Contact 7 | 15.5 |

Various patent and/or scientific literature references have been referred to throughout this application. The disclosures of these publications in their entireties are hereby incorporated by reference as if written herein to the extent that such disclosures are not inconsistent with the invention and for all jurisdictions in which such incorporation by reference is permitted. In view of the above description and the examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the extraction systems and processes as illustrated and described, may be made by those skilled in the art, without departing from the scope of the present teachings. Consequently, the scope of the present teachings should not be limited to the foregoing description, but should be defined by the appended claims.

What is claimed is:

1. A solvent extraction process for recovering a metal present at low concentration from an acidic aqueous solution, the process comprising:
   a) contacting in a mixer the acidic aqueous solution with an organic phase solution comprising 5-nonylsalicylaldoxime, thereby extracting at least part of the metal from the acidic aqueous solution into the organic phase solution; increasing or maintaining the concentration of metal in the organic phase solution by recycling from 50-100% by volume of the organic phase solution containing the metal and contacting the organic phase solution with the acidic aqueous solution containing the metal until the concentration ranges from 0.3 g/L to 25 g/L;
   b) contacting the organic phase solution containing metal with an aqueous phase strip solution comprising an inorganic compound that back-extracts the metal, thereby stripping at least part of the metal from the organic phase solution to the aqueous phase strip solution; and
   c) separating the metal from the aqueous phase strip solution, thereby recovering the metal.

2. A process according to claim 1, wherein the recycling step comprises flowing an aqueous phase solution in contact with an organic phase solution wherein a metallurgical organic phase to aqueous phase ratio is from 0.001 to 0.20, and setting an internal organic phase to aqueous phase ratio of 0.5 to 2.0 in the mixer.

3. A process according to claim 1, wherein the recycling step is continuous.

4. A process according to claim 1 further comprising one or more scrubbing steps performed by contacting at least part of the organic phase solution loaded with metal with a mineral acid solution, thereby removing any impurities from the organic phase solution.

5. A process according to claim 1 further comprising a second recycling step comprising recycling from 5-100% by volume of the aqueous phase strip solution containing the metal and contacting the aqueous phase strip solution with an organic phase solution containing the metal, thereby increasing or maintaining the concentration of the metal in the aqueous phase strip solution.

6. A process according to claim 5, wherein the second recycling step is performed until the concentration of metal in the aqueous phase strip solution is at least from 5.0 g/L to 200 g/L.

7. A process according to claim 5, wherein the second recycling step comprises flowing an aqueous phase strip solution in contact with an organic phase solution containing the metal wherein the organic phase to aqueous phase ratio is 1 to 1000, and setting an internal organic phase to aqueous phase ratio of 0.5 to 10 in the mixer.

8. A process according to claim 1, wherein the combined concentration factor from steps (a) and (b) is from 20 to 10,000.

9. A process according to claim 1, wherein the process is performed following a major metal extraction.

10. A process according to claim 1, wherein the metal is chosen from one or more members selected from the group consisting of transition metals, alkali metals, alkaline earth metals, rare earth metals, lanthanides, and actinides.

11. A process according to claim 1 further comprising stripping a second metal from the organic phase solution with a second aqueous phase strip solution comprising a compound that is specific for stripping the second metal.

12. A process according to claim 10, wherein the metal is a transition metal.

13. A process according to claim 12, wherein the transition metal is molybdenum.

14. A process according to claim 12, wherein the transition metal is copper.

15. A process according to claim 10, wherein the metal is a rare earth metal or actinide metal.

16. A solvent extraction process for recovering a metal present at low concentration from an acidic aqueous solution, the process comprising:
   contacting in a mixer the acidic aqueous solution with an organic phase solution comprising:
   (a) a phosphinic acid compound represented by:

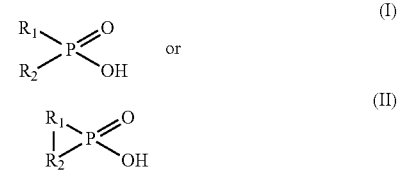

wherein each of $R_1$ and $R_2$ is independently chosen from an optionally substituted radical selected from the group consisting of $C_1$-$C_{30}$ alkyl, $C_3$-$C_{30}$ cycloalkyl, $C_3$-$C_{30}$ alkoxyalkyl, $C_4$-$C_{30}$ alkylcyclo, $C_7$-$C_{30}$ alkylaryl, $C_7$-$C_{30}$ aralkyl, and $C_8$-$C_{30}$ cycloalkylaryl; and (b) a modifier compound comprising a functional group selected from the group consisting of phenols, aromatic esters, aliphatic esters, organophosphorus compounds, phosphates, phosphine oxides, aromatic aliphatic alcohols, aliphatic alcohols, nitriles, ketones, amides, carbamates, sulfoxides, ureas, carbonates, oximes, ethers, polyethers, ester-ethers, phosphonium salts, ammonium salts, and combinations thereof, thereby extracting at least part of the metal from the acidic aqueous solution into the organic phase solution;

increasing or maintaining the concentration of metal in the organic phase solution by recycling from 50-100% by volume of the organic phase solution containing the metal and contacting the organic phase solution with the acidic aqueous solution containing the metal until the concentration ranges from 0.3 g/L to 25 g/L;

contacting the organic phase solution containing metal with an aqueous phase strip solution comprising an inorganic compound that back-extracts the metal, thereby stripping at least part of the metal from the organic phase solution to the aqueous phase strip solution; and separating the metal from the aqueous phase strip solution, thereby recovering the metal.

17. A process according to claim 16, wherein the metal is chosen from one or more members selected from the group consisting of transition metals, alkali metals, alkaline earth metals, rare earth metals, lanthanides, and actinides.

18. A process according to claim 17, wherein the metal is a transition metal.

19. A process according to claim 18, wherein the transition metal is molybdenum.

20. A process according to claim 18, wherein the transition metal is copper.

* * * * *